Dec. 2, 1941.  A. V. DE FOREST  2,264,968
APPARATUS FOR MEASURING WALL THICKNESS
Filed Feb. 14, 1938
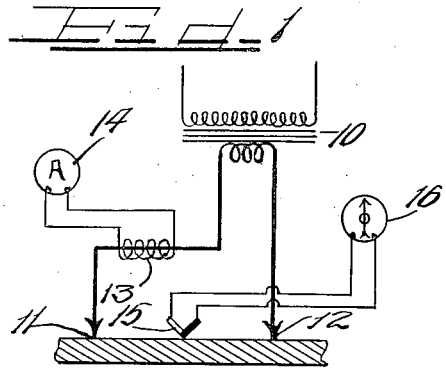
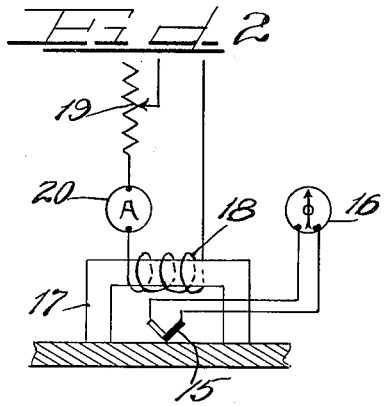
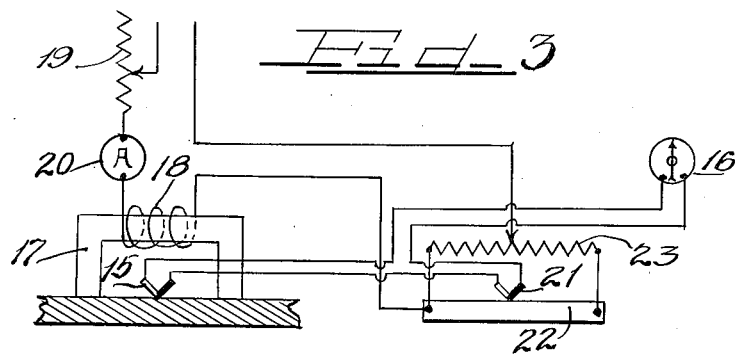
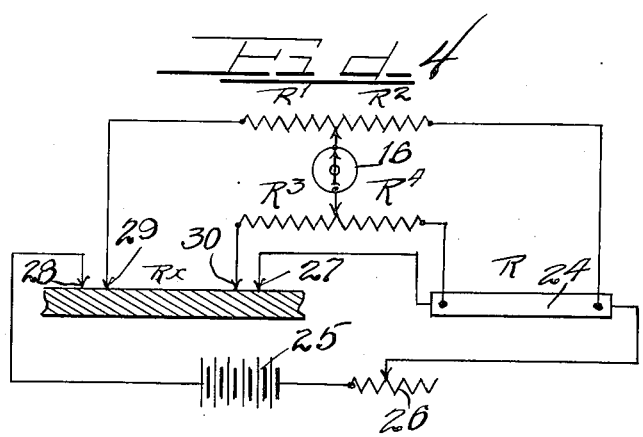
Inventor
Alfred V. DeForest.
by Charles A. Hill
Attys.

Patented Dec. 2, 1941

2,264,968

UNITED STATES PATENT OFFICE 2,264,968

APPARATUS FOR MEASURING WALL THICKNESS

Alfred V. de Forest, Marlboro, N. H., assignor, by mesne assignments, to Magnaflux Corporation, Chicago, Ill., a corporation of Delaware Application February 14, 1938, Serial No. 190,353

3 Claims. (Cl. 73—51)

The present invention relates in general to an improved apparatus for measuring the thickness of metal plates and the like, where only one side of the plate is accessible.

It is a primary object of the invention to provide a simple improved apparatus, which may be utilized for the measuring of the thickness of the walls of boilers, pipes, and the like for the purpose of ascertaining any changes in thickness which may have resulted from some cause or other, such as for example, from corrosion.

A further object of the invention is to provide improved means whereby the temperature of a heated section of the wall to be measured may be compared with the temperature of a standard specimen having known characteristics.

Further objects and features of the invention will more fully appear from the following detailed description taken in connection with the accompanying drawing, which illustrates several embodiments thereof, and in which:

Figure 1 is a view schematically illustrating one manner of practicing the invention wherein a section of the wall is heated by the passage of current therethrough and the rate of temperature rise determined;

Figure 2 is a similar view disclosing another manner of practicing the invention wherein the section is subjected to a magnetic field and heated as a result of eddy currents flowing in the metal;

Figure 3 schematically discloses another manner of practicing the invention wherein the section of the wall being tested is compared with a standard specimen of known characteristics, and shows an arrangement of thermocouples connected in opposition to indicate the difference in temperatures between the wall section and the standard specimen; and Figure 4 is a view schematically illustrating another manner in which the invention may be practiced, wherein a section of the wall being tested and a standard specimen of known characteristics are respectively disposed in the arms of a bridge circuit.

As shown on the drawing:

In general, the present invention contemplates determining the thickness of a piece of metal accessible only from one side by the resulting rise in temperature of adjacent metal, when a known quantity of heat is applied to the metal. For example, suppose a large metal plate to be held over an open flame, and that the plate is surrounded by air or an equivalent gas. At the end of a convenient time, for instance, one minute, the metal is withdrawn (or vice versa) and the local temperature of the metal is measured by means of a thermocouple. The resulting temperature will depend on the thermal conductivity of the metal which will govern the area of plates heated. This area is assumed to be greater than the thickness of the plate. A second factor will be the thickness of the plate, for this with the conductivity will determine the volume affected by the heat supplied. A third factor will be the specific heat of the metal, and a fourth factor will be the temperature loss by radiation and conduction from the hot portion of the plate. Also, a fifth factor will be the rate at which heat is transferred from the hot gases of the flame to the metal and will depend on the surface finish, the presence of oxides, paint or scale.

For any given metal of known conductivity and specific heat, the test may be carried out sufficiently rapidly so that radiation is not important, and if saturated steam is used in place of the hot gas, the conditions of the surface become less important. However, heavy scale is a serious difficulty and may require removal for a test. The temperature reached then depends on thickness only and bears a linear relation thereto over the practical working limits which are convenient to use.

Wherever magnetic metals are used, a convenient source of heat is derived from the hysteresis and eddy currents which result from a varying magnetic field, and for non-magnetic metals a high frequency magnetic field can be used.

In the arrangement shown in Figure 1, it is proposed to pass an electric current through a section of the metallic wall the thickness of which is to be measured. This current is of sufficient value to produce an appreciable temperature rise in the metal without causing local heating.

For this purpose a transformer 10 having a low voltage high current secondary winding has its secondary winding connected to spaced contacts 11 and 12 which are firmly secured as by clamps or otherwise to the surface of a section of the wall which is to be tested.

The amount of current passing through the wall metal between these contacts may be measured by a suitable current transformer 13 which is connected on its secondary winding to a suitable indicating instrument such as an ammeter 14.

Within certain limits, the rate of heating is inversely proportional to the thickness of the wall. By determining the temperature rise for a predetermined interval of time when passing a given amount of current through the wall section of walls of different thicknesses, the temperature rise may be utilized for determining the thickness of the wall being tested.

For measuring the temperature rise of the wall, a thermocouple 15 is placed midway between the points 11 and 12. This thermocouple is connected to a galvanometer 16 which, if desired, may be calibrated in terms of temperatures.

In utilizing this arrangement, it has been found that by placing ⅛ inch diameter copper contacts five inches apart on the wall, a ¼ inch plate with 520 amperes flowing between the contacts will produce a temperature rise of approximately 12° C. per minute. Under the same conditions, a ⅛ inch plate will have an 18° C. rise per minute. For walls of larger thickness, greater current will be required. For a 1 inch thick plate, 1000 amperes raises the temperature 1.5° C. per minute.

From the foregoing, it will be apparent that, knowing the rate of temperature rises in plates of different thickness when predetermined amounts of current are passed therethrough, the above arrangement will give an indication as to the thickness of the plate and whether there has been any change in this thickness as a result of corrosion or for any other reason.

The foregoing arrangement is particularly adapted for use where there might be considerable variations in the magnetic properties of different plates. However, where there is little or no variation in the magnetic properties and the magnetic properties are substantially uniform, the arrangement shown in Figure 2 may be satisfactorily used.

Figure 2 discloses an arrangement which instead of directly passing current through the plate to be tested utilizes a magnetic yoke 17 which is arranged to be excited by an energizing coil 18. This coil is connected to a suitable source of electric supply and there may be provided in series with the coil a variable resistor by means of which the coil current may be regulated. The coil current may be read by a suitable ammeter 20 which is connected in the coil circuit.

In this arrangement, the pole faces of the magnetic yoke are spaced apart a predetermined distance and applied to the surface of the plate which is to be tested. Magnetic lines of flux will pass through the plate section from one pole of the yoke to the other, and in so doing, will set up eddy currents which will heat up the plate section between the poles of the yoke. The rate of temperature change for a given time interval may be determined in the same manner as in the arrangement disclosed in Figure 1 by means of a thermocouple and indicating galvanometer calibrated to read in terms of temperatures.

In Figure 3, there is shown a direct method in which the wall is heated in the same manner as disclosed in the arrangement of Figure 2. In this instance, however, instead of reading the rate of temperature rise on a galvanometer, the thermocouple associated with the wall being measured is connected in opposition with a thermocouple 21 which measures the temperature rise of a metallic piece 22. This metallic piece may be heated in any desired manner. For this purpose I have found it desirable to heat this piece by passing a proportioned amount of the current therethrough which is utilized for energizing the coil 18 of the yoke.

Proportioning a current through the plate 22 may be accomplished by providing a variable shunt resistant 23 which is connected at its ends to the ends of the plate. This plate will therefore form a standard which may be calibrated to effect a rate of temperature rise corresponding to different thicknesses of plates or walls which are to be tested.

By connecting the galvanometer to the two thermocouples connected in opposition, the galvanometer will then measure the difference in temperature between the rate of heating of plate 22 and the wall which is under test.

If the series resistor 19 is adjusted so that for a plate of predetermined thickness it should have the same rate of temperature change as the adjusted standard, then, if the section of the wall is less than the thickness which it should be, the galvanometer would be deflected in one direction. If the wall is thicker than the predetermined thickness, then the galvanometer would be deflected in the other direction. A few standard steps may be previously determined for the standard, and with this arrangement a rough measurement may be made in a relatively short time. Moreover, by making the heat capacity of the standard relatively low so that it may be cooled fairly rapidly by air or otherwise, the arrangement may be used for other tests a comparatively short time after the completion of a single test.

Although the opposed thermocouple arrangement of indication is shown as being utilized with the arrangement shown in Figure 2, it will be evident that this method of indication may with equal facility be utilized with the arrangement shown in Figure 1.

Where it is necessary to obtain the wall thickness with particular accuracy, the arrangement shown in Figure 4 may be utilized. In this arrangement, a direct resistance measurement with a known length of plate may be made by the well known Kelvin bridge circuit, or other suitable bridge connections may be used.

For low carbon steel the resistance of a known length of the wall which is to be measured may be considered proportional to the thickness of a standard 24 having a known resistance. Current is supplied from a battery 25 through a variable resistance 26 and thence through the specimen 24 and between spaced points 27 and 28 of the wall under test, the wall and specimen being thus connected in series. The specimen 24 and the wall between points 29 and 30 are respectively connected to form arms of the bridge circuit.

Letting the resistance of the wall under test between points 29 and 30 equal $R_x$ and the resistance of the specimen, which is known, be represented by $R$, the resistance $R_x$ may be determined in terms of the resistances $R_1$, $R_2$, $R_3$ and $R_4$. If the ratio of resistances $R_1/R_2$ is maintained equal to $R_3/R_4$, then $R_x$ equals $(R_1/R_2)R$.

In the case of alloy steel a measurement can be made where the thickness of the wall is easily checked, and the figures for specific resistance used in determining the resistance of plate 24 so as to enable determination of the thickness of the wall structure of another part.

From the foregoing description, it will be apparent that the present invention provides improved apparatus which may be utilized for the measuring of the thickness of walls such as boilers, pipes and the like, where only one surface is accessible; and improved means whereby the temperature of a heated section of the wall to be measured may be compared with the temperature of a standard specimen having known characteristics.

It is, of course, to be understood that although I have described in detail several embodiments of the invention, the invention is not to be thus limited, but only insofar as defined by the scope and spirit of the appended claims.

I claim as my invention:

1. In a device for measuring the thickness of a metallic wall, electro-magnetic means for setting up in the wall metal a magnetic field between spaced points thereof, an energizing circuit for said means, a specimen corresponding to the material in said wall connected in said circuit, means for varying the amount of current in said circuit passing through said specimen, thermocouples respectively responsive to the heating of said wall between said spaced points and the heating of the specimen, said thermocouples being connected in opposition, and means for indicating an unbalancing of currents from said thermocouples.

2. In a device for measuring the thickness of a metal wall, electro-magnetic means for setting up in the wall metal a magnetic field between spaced points thereof, an energizing circuit for said means, a specimen having known characteristics connected in said circuit, a variable resistance in shunt connection with said specimen thermocouples respectively responsive to the heating of said wall between said spaced point and the heating of the specimen, said thermocouples being connected in opposition, and mean for indicating any difference between the currents from said thermocouples.

3. In the determination of the thickness of short portion of the metallic wall of a stationar wall or the like, and in a relatively narrow zon of the portion, in combination, a source of electromagnetic energy, a pair of spaced terminal connected to said source to be seated on one surface of a short portion of the wall to cause energy flow in the short portion and in a relatively narrow zone in the interspace between said terminals, current-indicating means in circuit connection with said terminals, a thermocouple to be applied to the one surface at a point in the interspace between said terminals, and current responsive means in circuit connection with said thermocouple.

ALFRED V. DE FOREST.